US009663623B2

United States Patent
Wang

(10) Patent No.: US 9,663,623 B2
(45) Date of Patent: May 30, 2017

(54) RESOURCE UTILIZATION OF PAINT SLAG-CONTAINING WASTE LIMESTONE POWDER AND TREATMENT PROCESS THEREOF

(71) Applicant: SHANGHAI YIKE GREEN ENGINEERING CO., LTD, Shanghai (CN)

(72) Inventor: Xiaolei Wang, Shanghai (CN)

(73) Assignee: SHANGHAI YIKE GREEN ENGINEERING CO., LTD., Yangpu District, Shanghai (CN)

( * ) Notice: Subject to any disclaimer, the term of this patent is extended or adjusted under 35 U.S.C. 154(b) by 92 days.

(21) Appl. No.: 14/308,521

(22) Filed: Jun. 18, 2014

(65) Prior Publication Data

US 2015/0064459 A1 Mar. 5, 2015

(30) Foreign Application Priority Data

Aug. 27, 2013 (CN) .......................... 2013 1 03799774

(51) Int. Cl.
*C08L 95/00* (2006.01)
*C08J 5/18* (2006.01)
(Continued)

(52) U.S. Cl.
CPC ...... *C08J 5/18* (2013.01); *B09B 3/00* (2013.01); *B29C 43/24* (2013.01);
(Continued)

(58) Field of Classification Search
None
See application file for complete search history.

(56) References Cited

U.S. PATENT DOCUMENTS 4,237,176 A * 12/1980 Brueggemann ......... C04B 26/18
181/294
4,412,864 A * 11/1983 Kurashige ............... C08L 95/00
106/235
(Continued)

FOREIGN PATENT DOCUMENTS

CN EP 2862639 A1 * 4/2015 ............... B09B 3/00
GB 1000830 A * 8/1965 ............. B29C 70/22

OTHER PUBLICATIONS

George, Wypych, "Handbook of Fillers", 2010, ChemTec Publishing, 3rd edition, p. 41 and p. 123.*
(Continued)

*Primary Examiner* — Anish Desai
(74) *Attorney, Agent, or Firm* — Global IP Services; Tianhua Gu

(57) ABSTRACT

An asphalt damping sheet, which comprises the following components in indicated amounts based on the total mass of the asphalt damping sheet: a paint slag-containing waste limestone powder 20-50 parts; soft pitch 1-5 parts; hard pitch 11-15 parts; a non-metallic mineral 29-59 parts; PET short fiber 0.1-1.5 parts; and said non-metallic mineral is selected from the group consisting of quartz sand, pottery clay and mica powder. The technical process in the invention uses the paint slag-containing waste limestone powder generated in dry separation process of overspray adopted by vehicle manufacturer paint shops as filler in the asphalt damping sheets, such asphalt damping sheets can be used in the field of machine manufacturing such as automobiles and ships, and also can be used in the field of building waterproof materials, and the goal of resource recycling is achieved.

5 Claims, 7 Drawing Sheets

(51) Int. Cl.
- B29C 43/24 (2006.01)
- B09B 3/00 (2006.01)
- B29K 67/00 (2006.01)
- B29K 95/00 (2006.01)
- B29K 105/00 (2006.01)
- B29K 105/26 (2006.01)
- F16F 9/30 (2006.01)

(52) U.S. Cl.
CPC .... *B29K 2067/003* (2013.01); *B29K 2095/00* (2013.01); *B29K 2105/0005* (2013.01); *B29K 2105/26* (2013.01); *C08J 2395/00* (2013.01); *C08J 2467/02* (2013.01); *C08J 2495/00* (2013.01); *F16F 9/30* (2013.01); *Y10T 428/28* (2015.01)

(56) References Cited

U.S. PATENT DOCUMENTS

| | | | | |
|---|---|---|---|---|
| 4,937,995 A * | 7/1990 | Deffeyes | G09F 3/00 | 148/105 |
| 4,966,929 A * | 10/1990 | Tomoshige | B32B 11/04 | 428/220 |
| 5,227,234 A * | 7/1993 | Kauchi | C08J 7/047 | 427/207.1 |
| 5,232,763 A * | 8/1993 | Holbek | E04D 5/12 | 156/176 |
| 5,324,758 A * | 6/1994 | Takahashi | C08L 95/00 | 524/519 |
| 6,508,875 B1 * | 1/2003 | Bodt | C08L 95/00 | 106/273.1 |
| 9,243,402 B2 * | 1/2016 | Stopin | C08L 95/00 | |
| 2003/0073368 A1 * | 4/2003 | Berkhoff | B32B 5/26 | 442/389 |
| 2003/0106836 A1 * | 6/2003 | Orac | C10C 1/16 | 208/43 |
| 2005/0266237 A1 * | 12/2005 | Asthana | C09K 3/10 | 428/343 |
| 2008/0255277 A1 * | 10/2008 | Bobee | C08L 95/00 | 524/62 |

OTHER PUBLICATIONS

Definition of "pitch" from Merriam Webster dictionary, retrived Jan. 4, 2016.*

Definition of "asphalt" from Merriam Webster dictionary, retrived Jan. 4, 2016.*

James G. Speight, "Gasification of Unconventional Feedstocks", 2014, Gulf Professional Publishing, pp. 10-12.*

Chuan-hua Song, "Modified Production Process for an Environmentally Friendly Damping Film Using Paint Residue", English translation of China Patent Application Publication CN 101531818A, published on Sep. 6, 2009.*

Li, Wei-guo et al., "High Molecular Hot Melting Damping Materials and Their Preparation Method", English translation of China Patent Application Publication CN1594436A, published on Mar. 16, 2005.*

Kazuo Shimura et al., "Vibration Damping Member", English translation of Japanese patent application publication JP58203247A, published on Nov. 26, 1983.*

Kazuo, Shimura et al., "A Dampening Material Composition", English translation of Japanese patent application JP58213047A, published on Dec. 10, 1983.*

* cited by examiner

RESOURCE UTILIZATION OF PAINT SLAG-CONTAINING WASTE LIMESTONE POWDER AND TREATMENT PROCESS THEREOF

CROSS REFERENCE TO RELATED PATENT APPLICATIONS

The present application claims the priority of Chinese patent application No. 2013103799774 filed Aug. 27, 2013.

TECHNICAL FIELD

The invention relates to a process solution for resource utilization of paint slag-containing waste limestone powder, and particularly relates to the use of waste limestone powder in the filler of asphalt damper sheets and recycling in automobile manufacturing.

BACKGROUND OF THE INVENTION

Currently, a dry separation process of overspray is used in the paint workshops of major vehicle manufacturers for handling paint overspray, and such process enables the coating production to get closer to the goal of "green" since it not only reduces energy consumption by 60% and fresh water consumption by 44% but also reduces the carbon dioxide emission by about 33% as compared to the traditional painting workshops. Said technology utilizes a dry purification device to handle the paint mist, and one of the main features of this new technology is to use limestone powder as binding agents. Using limestone powder as a binding agent and the dry particles of overspray are taken away via the air circulation. Said dry separation treatment process of overspray uses tap water and water treatment chemicals no longer, and thus no wastewater is discharged. The limestone powder containing paint slag is the major waste from this process.

Currently, the saturated waste limestone powder after the usage is disposed by way of incineration. And this not only costs high disposal expenses annually but also brings about certain of environmental protection burden, and the incineration disposal process inevitably consumes a lot of energy and tends to cause a second pollution. If the waste limestone powder could be utilized as a feedstock or even be re-used in the automobile manufacturing, then the waste generated during the manufacturing process would be consumed in the automobile manufacturing links, and the environmental burden caused to the society is zero, which saves a lot of human and material resources.

An asphalt damping sheet is a damping sheet using asphalt and non-metallic minerals as raw materials. An asphalt damping sheet as a viscous-elastic material can be attached to the inner surface of vehicle body and can be glued tightly to the steel wall of the vehicle body mainly for reducing noise, reducing vibration and isolating the vibration transmission pathway, i.e. acts as a damper. At the present time, almost all domestic passenger cars are equipped with asphalt damping sheets.

SUMMARY OF THE INVENTION

The object of the invention is the resource utilization of a paint slag-containing waste limestone powder generated in the paint workshops of vehicle manufacturers, which is used as filler in the production of environmentally friendly asphalt damping sheets, so as to address the problems of energy waste and secondary pollution caused by the incineration treatment.

The paint slag-containing waste limestone powder used in the invention is the one generated by the dry separation process of overspray adopted in the dry spray booth of the vehicle manufacturer paint workshops. Wherein, the raw limestone powder is the raw limestone powder of 400 meshes according to KKS451 standard.

To that end, the following technical solutions are used in this invention:

an asphalt damping sheet, the raw material of which comprises the following components in indicated amounts relative to the total mass of the asphalt damping sheet:

a paint slag-containing waste limestone powder: 20-50 parts;

soft pitch: 1-5 parts;

hard pitch: 11-15 parts;

a non-metallic mineral: 29-59 parts;

PET short fiber: 0.1-1.5 parts;

said non-metallic mineral is selected from the group consisting of quartz sand, pottery clay and mica powder.

Said PET short fiber is polyethylene terephthalate short fiber.

Preferably, the amount of the paint slag-containing waste limestone powder in the raw material is 20-40 parts.

Preferably, the amount of PET short fiber in the raw material is 1-1.5 parts.

Preferably, said soft pitch is 30# GB according to GBT 494-2010 China national standard for asphalt.

Preferably, said hard pitch is non-standard asphalt with a melting point ranging from 100° C. to 130° C.; and more preferably, said hard pitch is non-standard asphalt with a melting point ranging from 110° C. to 120° C.

Preferably, the particle size of the said quartz sand is 100-300 meshes.

Preferably, the length of the said PET short fiber is 0.8-2 mm.

Preferably, the raw material of said asphalt damping sheet further comprises 6-15 parts of magnetic powder based on the total mass of the asphalt damping sheet.

Preferably, said asphalt damping sheet further comprises an adhesive layer on the surface of the asphalt damping sheet.

Preferably, the material of said adhesive layer is pressure-sensitive adhesive.

Also provided in the invention is a preparation process of the above asphalt damping sheet, which specifically comprises the steps of:

(1) proportioning: the proportioning is carried out according to the ratio of each component required in the asphalt damping sheet;

(2) mixing: the mixing is carried out in a mixing roll at the temperature of 100-160 for 40-80 minutes;

(3) calendering: the calendering is carried out in a calender in accordance with the desired thickness and width;

(4) cooling: spray cooling;

(5) molding;

(6) transfer coating of splitting;

(7) stamping;

(8) off-line, and packaging into finished product after passing inspection.

Further disclosed in the invention is the use of a paint slag-containing waste limestone powder in the preparation of asphalt damping sheets as raw material of the asphalt damping sheets.

The above use means that said paint slag-containing waste limestone powder is used as filler in the asphalt damping sheets.

Also disclosed in the invention is the use of said asphalt damping sheets in the fields of automobiles or ships and building waterproof materials.

The technical process in the invention uses the paint slag-containing waste limestone powder, which is generated in dry separation process of overspray adopted by vehicle manufacturers, as filler in the asphalt damping sheets, and thus the wastes produced in the automobile manufacturing are recycled, besides, the asphalt damping sheets obtained by this process have better damping effects than those available commercially, and moreover, the asphalt damping sheets obtained by this process are free from visible mildew, apparent musty and apparent odor.

DETAILED DESCRIPTION OF THE PREFERRED EMBODIMENTS

Figure 1:
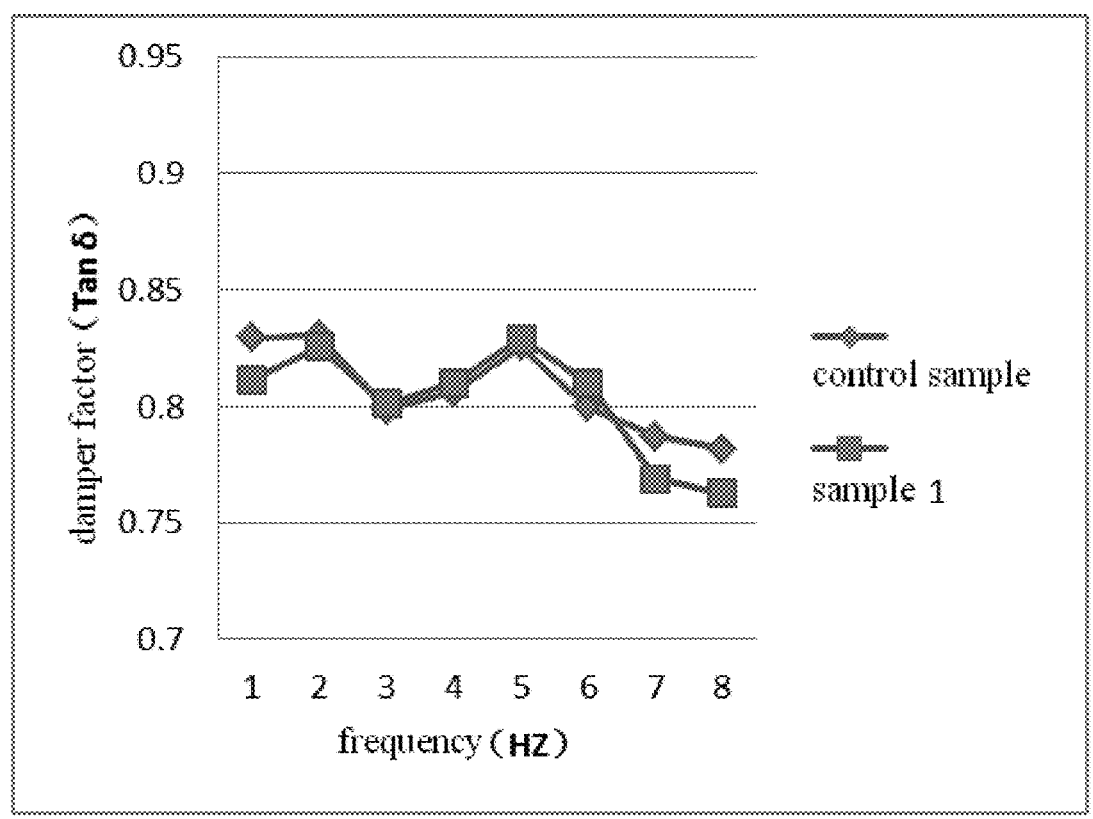
FIG. 1 shows the value of the damping factor tan δ of the sample of Embodiment 1 at different frequencies.
Figure 2:
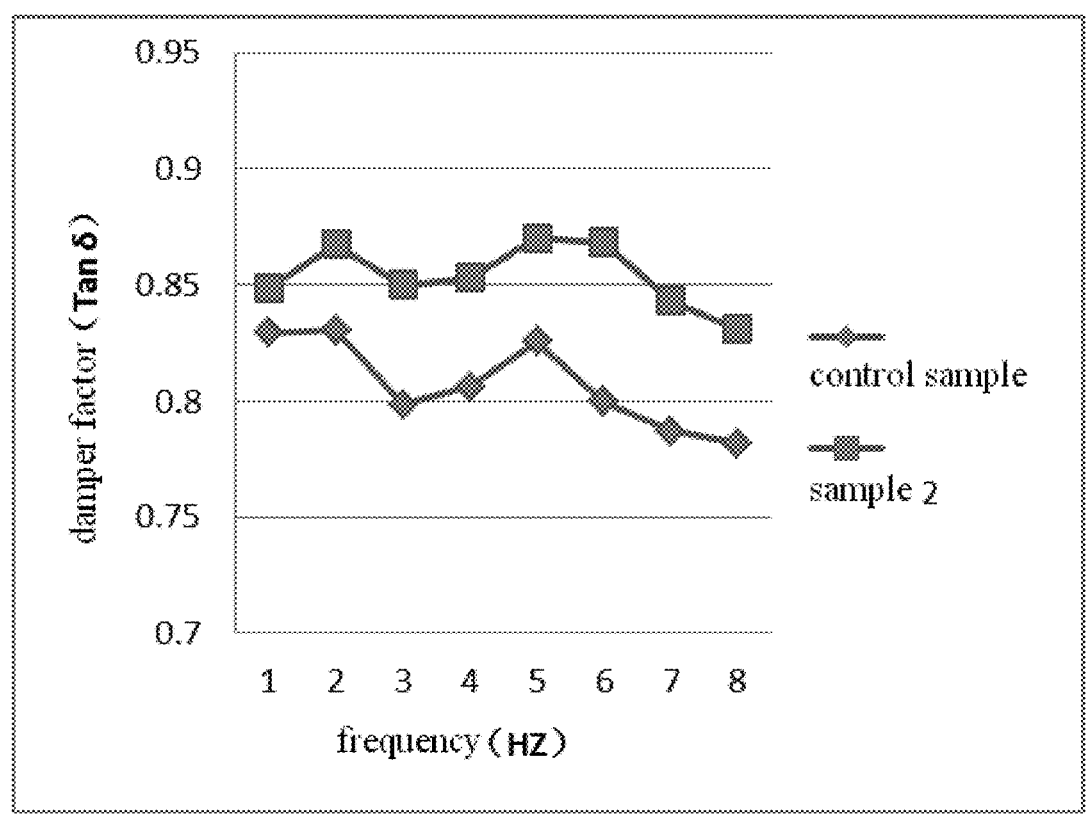
FIG. 2 shows the value of the damping factor tan δ of the sample of Embodiment 2 at different frequencies.
Figure 3:
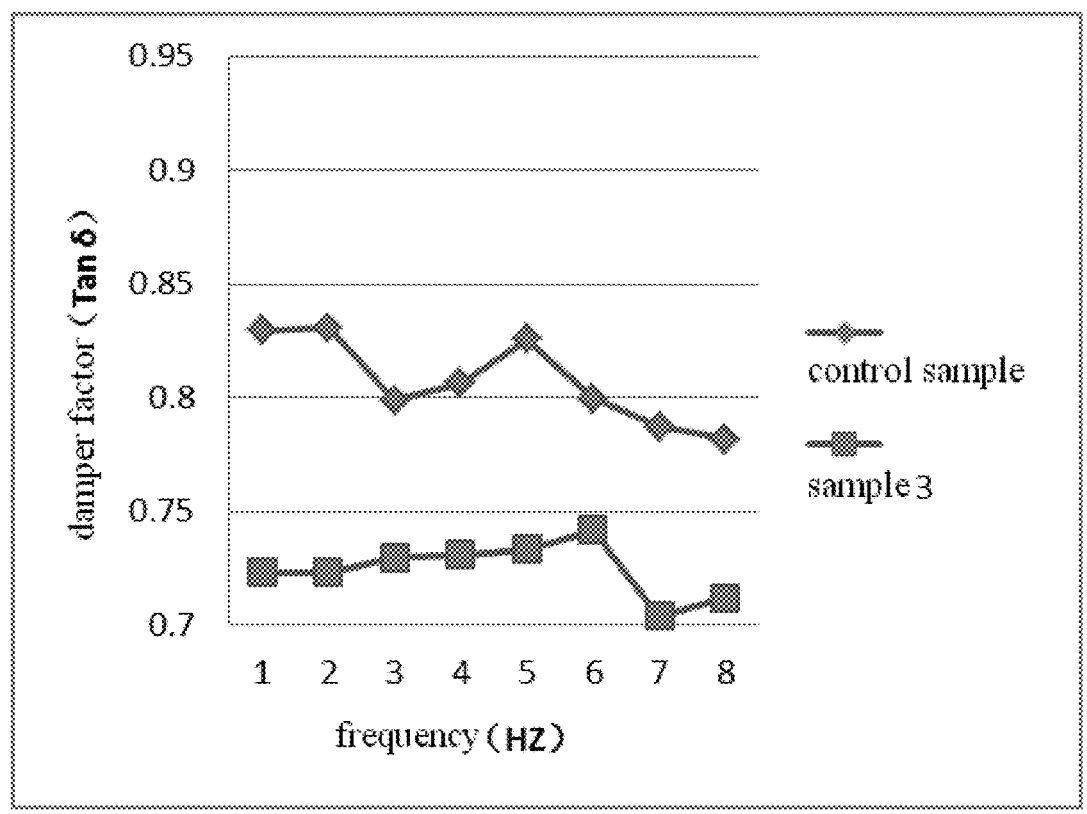
FIG. 3 shows the value of the damping factor tan δ of the sample of Embodiment 3 at different frequencies.
Figure 4:
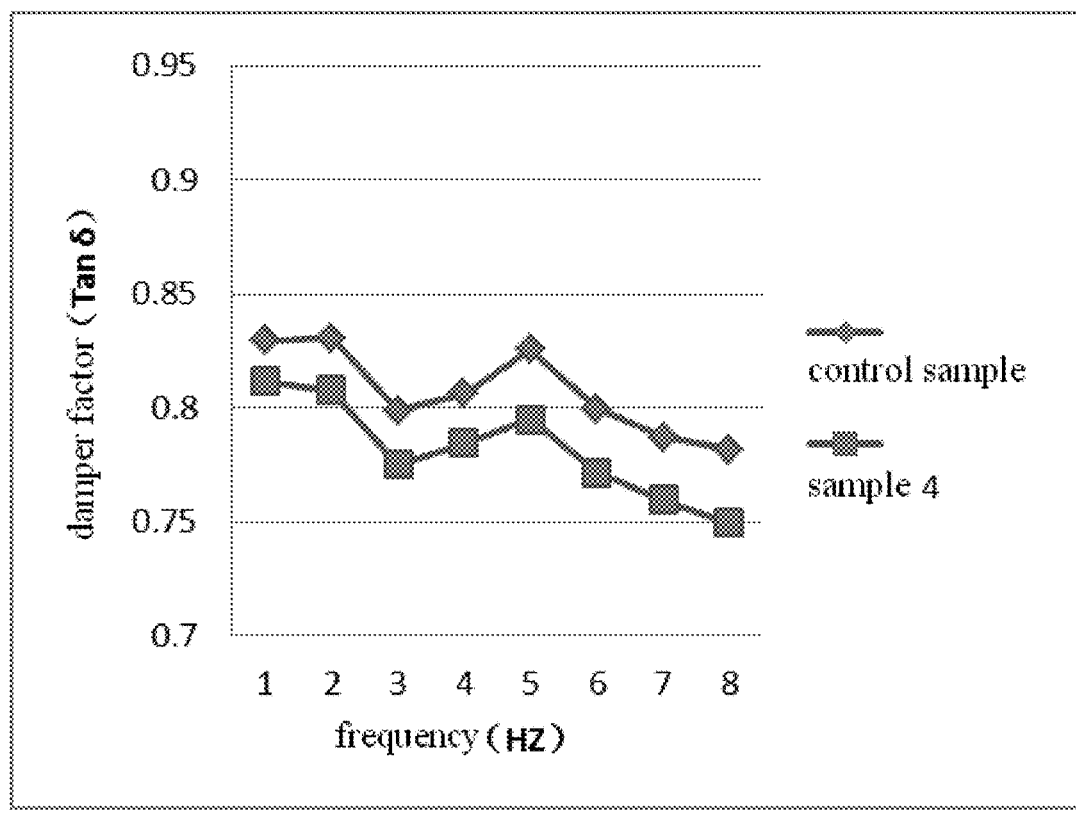
FIG. 4 shows the value of the damping factor tan δ of the sample of Embodiment 4 at different frequencies.
Figure 5:
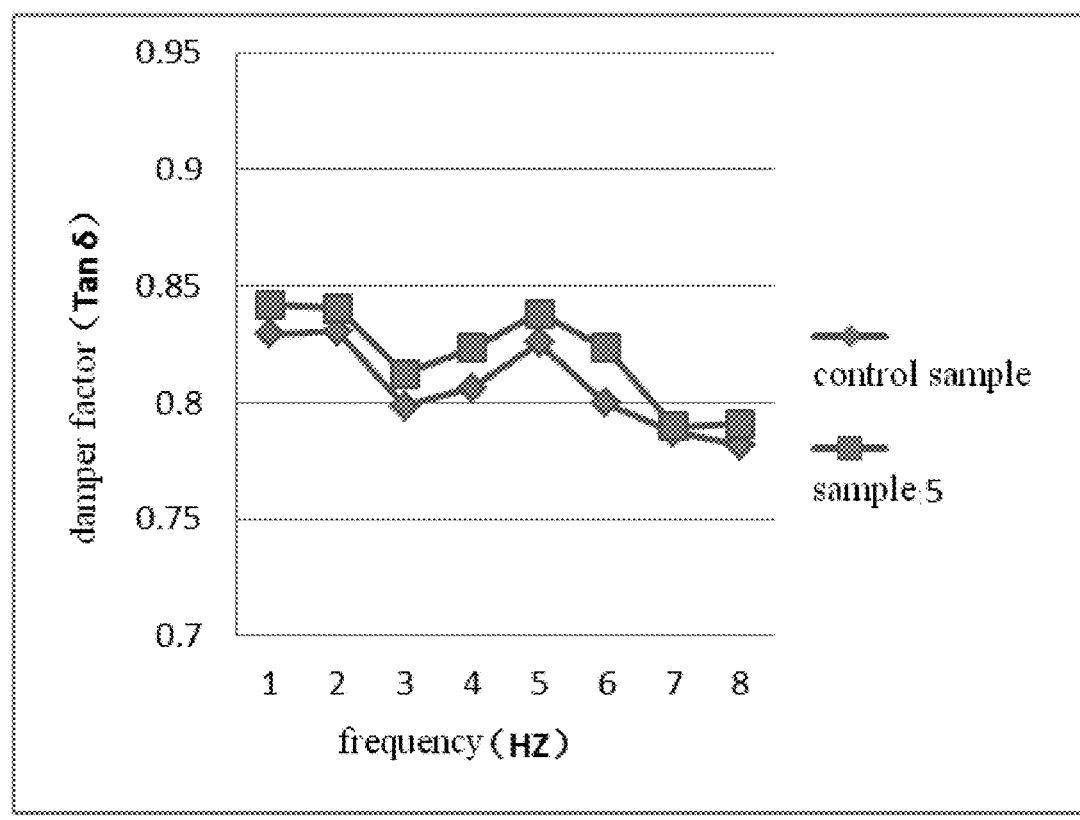
FIG. 5 shows the value of the damping factor tan δ of the sample of Embodiment 5 at different frequencies.
Figure 6:
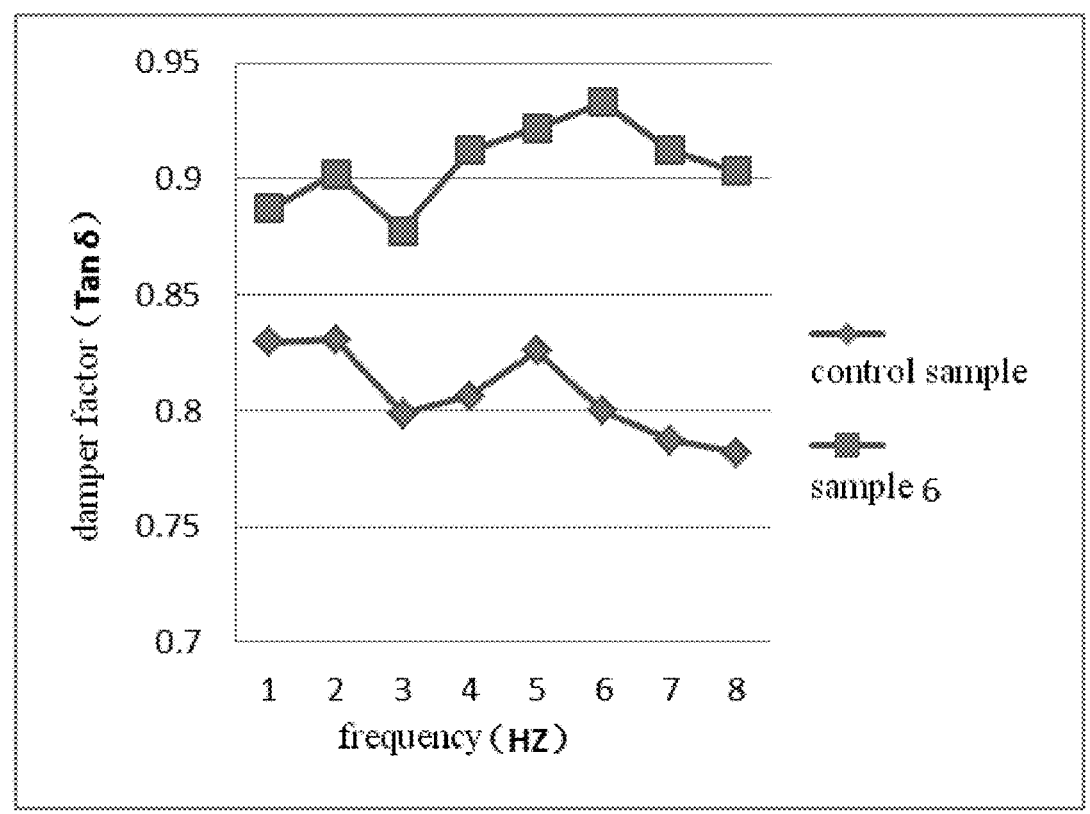
FIG. 6 shows the value of the damping factor tan δ of the sample of Embodiment 6 at different frequencies.
Figure 7:
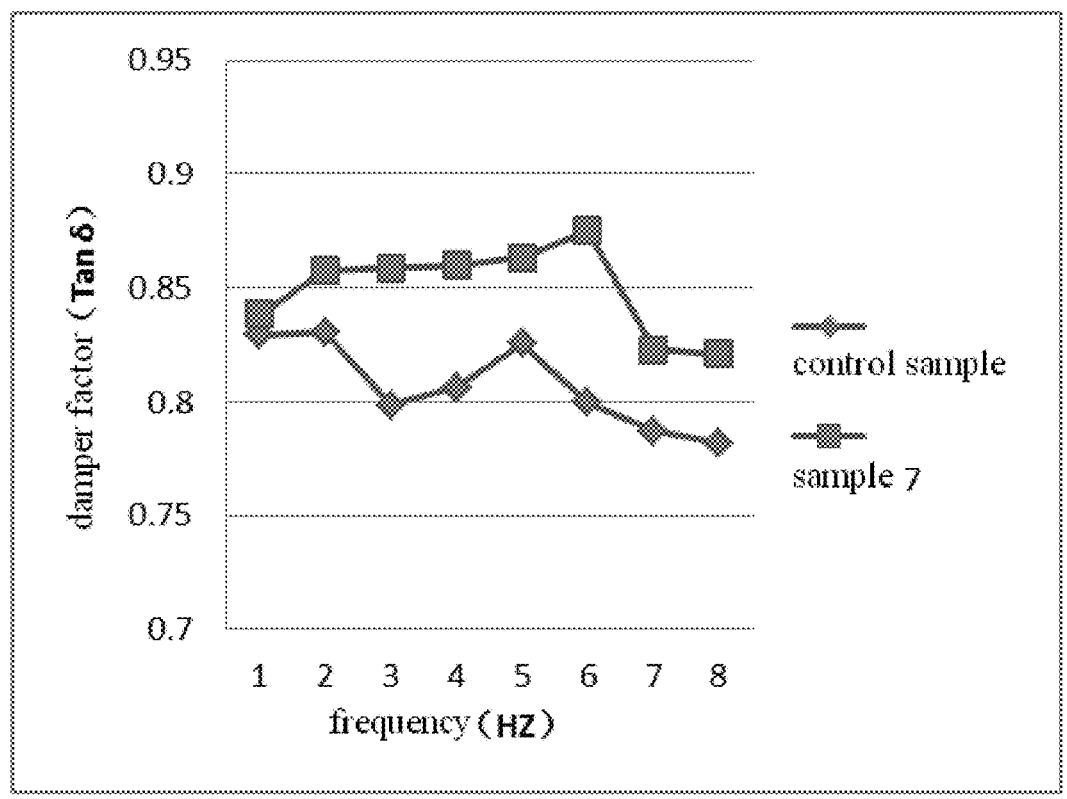
FIG. 7 shows the value of the damping factor tan δ of the sample of Embodiment 7 at different frequencies.

The invention is described by way of the following specific embodiments, and it is understood that these embodiments are provided for illustrative purpose only and cannot be construed as limitation of the scope of the invention.

The waste limestone powder used in the embodiments was the paint slag-containing waste limestone powder generated by the dry separation process of overspray adopted in the dry spray booth of the vehicle manufacturer paint shops. Wherein the type of raw limestone powder used in the dry separation process of overspray met KKS451 standard and which was the raw limestone powder of 400 meshes. Such limestone powder transformed into the paint slag-containing waste limestone powder after being used in the dry separation process of overspray, and the content of the paint slag was 7-13% relative to the total mass of the paint slag-containing waste limestone powder. The asphalt damping sheets obtained in the embodiments were compared with the control sample which was high quality asphalt damping sheet available on the market.

Embodiment 1

Paint slag-containing waste limestone powder: 30 parts;
Soft pitch (30#): 1 part;
Hard pitch (melting point: 112V): 15 parts;
Quartz sand (200 meshes): 53 parts;
PET short fiber: 1 part;
The above components were added into a two roll mixing roll at 120° C. and mixed for 60 minutes, and calendered in a vulcanizer at a pressure of 4 MPa and at a temperature of 100° C., naturally cooled and molded; the sample was cut into strips with a length of 17.5 mm or more, a width of 13 mm or less and a thickness of 2 mm; and tested at a temperature of 30° C. in DMA Q-800 single cantilever frequency-conversion constant-temperature testing.

The damping value of the material of embodiment 1 partially overlaps with the control sample, and their damping performances are similar within the frequency range.

Embodiment 2

Paint slag-containing waste limestone powder: 30 parts;
Soft pitch (30#): 3 parts;
Hard pitch (melting point: 112V): 13 parts;
Quartz sand (200 meshes): 53 parts;
PET short fiber: 1 part;
The above components were added into a two roll mixing roll at 120° C. and mixed for 60 minutes, calendered in a vulcanizer at a pressure of 4 MPa and at a temperature of 100° C., naturally cooled and molded; the sample was cut into strips with a length of 17.5 mm or more, a width of 13 mm or less and a thickness of 2 mm; and tested at a temperature of 30° C. in DMA Q-800 single cantilever-thermostatic frequency testing.

The gasket material characters such as hardness and softness were maintained and the amount of soft pitch was increased, then the damping value was slightly higher than that of the control sample within the frequency range.

Embodiment 3

Paint slag-containing waste limestone powder: 50 parts;
Soft pitch (30#): 3 parts;
Hard pitch (melting point: 112V): 13 parts;
Quartz sand (200 meshes): 33 parts;
PET short fiber: 1 part;
The above components were added into a two roll mixing roll at 120° C. and mixed for 60 minutes, calendered in a vulcanizer at a pressure of 4 MPa and at a temperature of 100° C., naturally cooled and molded; the sample was cut into strips with a length of 17.5 mm or more, a width of 13 mm or less and a thickness of 2 mm; and tested at a temperature of 30° C. in DMA Q-800 single cantilever frequency-conversion constant-temperature testing.

The gasket material characters such as hardness and softness were maintained, the ratio of waste limestone powder was increased and the ratio of the quartz sand was decreased, then the damping value was lower than that of the control sample within the frequency range.

Embodiment 4

Paint slag-containing waste limestone powder: 50 parts;
Soft pitch (30#): 5 parts;
Hard pitch (melting point: 112° C.): 11 parts;
Quartz sand (300 meshes): 33 parts;
PET short fiber: 1 part;
The above components were added into a two roll mixing roll at 120° C. and mixed for 60 minutes, calendered in a vulcanizer at a pressure of 4 MPa and at a temperature of 100° C., naturally cooled and molded; the sample was cut into strips with a length of 17.5 mm or more, a width of 13 mm or less and a thickness of 2 mm; and tested at a temperature of 30° C. in DMA Q-800 single cantilever frequency-conversion constant-temperature testing.

The gasket material characters such as hardness and softness were maintained and the ratio of soft pitch was increased and the ratio of hard pitch was decreased, then the damping value was slightly higher than that of embodiment 3, but still slightly lower than that of control sample within the frequency range.

Embodiment 5

Paint slag-containing waste limestone powder: 50 parts;
Soft pitch (30#): 5 parts;
Hard pitch (melting point: 112 V): 15 parts;
Quartz sand (300 meshes): 29 parts;
PET short fiber: 1 part;

The above components were added into a two roll mixing roll at 120° C. and mixed for 60 minutes, calendered in a vulcanizer at a pressure of 4 MPa and at a temperature of 100° C., naturally cooled and molded; the sample was cut into strips with a length of 17.5 mm or more, a width of 13 mm or less and a thickness of 2 mm; and tested at a temperature of 30° C. in DMA Q-800 single cantilever frequency-conversion constant-temperature testing.

The gasket material characters such as hardness and softness were maintained and the ratio of total pitch was increased, then the damping value was slightly higher than that of embodiment 3 and slightly higher than that of control sample within the frequency range, but the total cost would be increased.

Embodiment 6

Paint slag-containing waste limestone powder: 20 parts;
Soft pitch (30#): 5 parts;
Hard pitch (melting point: 112° C.): 15 parts;
Quartz sand (300 meshes): 59 parts;
PET short fiber: 1 part;

The above components were added into a two roll mixing roll at 120° C. and mixed for 60 minutes, calendered in a vulcanizer at a pressure of 4 MPa and at a temperature of 100° C., naturally cooled and molded; the sample was cut into strips with a length of 17.5 mm or more, a width of 13 mm or less and a thickness of 2 mm; and tested at a temperature of 30° C. in DMA Q-800 single cantilever frequency-conversion constant-temperature testing.

The gasket material characters such as hardness and softness were maintained and the ratio of quartz sand was increased, then the damping value was greatly increased compared to that of control sample, but the utilization of limestone powder would be decreased to some extent.

Embodiment 7

Paint slag-containing waste limestone powder: 40 parts;
Soft pitch (30#): 4 parts;
Hard pitch (melting point: 112 V): 12 parts;
Mica: 42.5 parts;
PET short fiber: 1.5 part;

The above components were added into a two roll mixing roll at 150° C. and mixed for 80 minutes, calendered in a vulcanizer at a pressure of 4 MPa and at a temperature of 100° C., naturally cooled and molded; the sample was cut into strips with a length of 17.5 mm or more, a width of 13 mm or less and a thickness of 2 mm; and tested at a temperature of 30° C. in DMA Q-800 single cantilever frequency-conversion constant-temperature testing.

The value of damping factor tan $\delta$ of the sample of each embodiment at different frequencies was shown in table 1 and FIG. 1. It can be seen from FIG. 1 and table 1 that, the damping performance of the sample of embodiment 2 exceeded that of the control sample, moreover, the raw material cost was optimal.

TABLE 1

The damping value of each embodiment

| Frequency (Hz) | Control sample (tan$\delta$) | tan$\delta$ value of each embodiment | | | | | | |
|---|---|---|---|---|---|---|---|---|
| | | Embodiment 1 | Embodiment 2 | Embodiment 3 | Embodiment 4 | Embodiment 5 | Embodiment 6 | Embodiment 7 |
| 55 | 0.8294 | 0.8114 | 0.8487 | 0.7232 | 0.8114 | 0.8421 | 0.8873 | 0.8387 |
| 65 | 0.8307 | 0.8255 | 0.8674 | 0.7234 | 0.8076 | 0.8405 | 0.902 | 0.8576 |
| 70 | 0.7988 | 0.8011 | 0.8498 | 0.73 | 0.7751 | 0.8123 | 0.8778 | 0.8588 |
| 75 | 0.8061 | 0.8101 | 0.8528 | 0.7311 | 0.7844 | 0.8233 | 0.9122 | 0.86 |
| 80 | 0.8256 | 0.8289 | 0.87 | 0.7332 | 0.7949 | 0.8381 | 0.9218 | 0.8633 |
| 85 | 0.7997 | 0.81 | 0.8683 | 0.742 | 0.7715 | 0.8232 | 0.9328 | 0.8751 |
| 90 | 0.7872 | 0.7691 | 0.843 | 0.7038 | 0.7597 | 0.79 | 0.9124 | 0.823 |
| 100 | 0.7818 | 0.7625 | 0.831 | 0.7121 | 0.7494 | 0.7912 | 0.9032 | 0.8212 |

The sample of embodiment 2 was tested for the following performances and the results were shown in table 2:

TABLE 2

Performances of the sample

| Name of experimental item | HG/T 4384-2012 trade standard | Test result | Individual conclusion | Remarks |
|---|---|---|---|---|
| Weight | — | The side of A4 paper weighed 460 g | — | — |
| Thickness | measured after the gasket and steel being baked | after the gasket was bonded to the steel plate, 2.80 mm | qualified | Thinner gaskets could be obtained by adjusting the thickness of the mold |

TABLE 2-continued

Performances of the sample

| Name of experimental item | HG/T 4384-2012 trade standard | Test result | Individual conclusion | Remarks |
|---|---|---|---|---|
| Density/ (mg/m$^3$) | Should be within 2.0-2.8 | 2.4 | qualified | Density depends on calendering conditions |
| tensile strength/MPa | Minimum tensile strength value should be 0.6 MPa | The minimal value in the test curve of the standard strip being tested was 1.2 MPa | qualified | Dumbbell ASTM D412 Die C 6 * 115 mm |
| Tear strength | Tearing Ts minimum value should be 5 KN/m | Calculated minimum value of the standard strip tested was 9 KN/m | qualified | Angle tear ASTM D624 Die C |
| Flexibility | Diameter 10 cm axis curl, no cracks | No cracks | qualified | — |
| Blocking resistance | stacking under standard conditions, no blocking occurs; release paper could be used | Some gaskets blocked, and some not | qualified | Standards could be met via the use of release paper |
| Baking conditions and properties after being baked | The adhesiveness was good after baked around 165° C., no cracking | No cracking, good adhesion | qualified | — |
| Consistency | Being consistent with the surface shape of ladder-type steel plate | The shape was consistent, and was consistent with the shape of cross-convex steel | qualified | — |
| Cold punching | After baking the bonding, chilled at minus 20° C. prior to cold punching | Comparative experiment, cold punch phenomenon were similar between sample and control sample | qualified | — |
| Vibration damping properties | Comparative experiments; | Loss value was high | qualified | Higher than the control sample (30° C.) |
| Shrinkage ratio/% | Drying method, the dimensional change should be less than 2.0% | Percentage of change was 0.4% | qualified | — |
| High temperature resistance | Attached to horseshoe-shaped steel plates after being baked, no-slip | no-slip | qualified | — |

The above performance tests were in accordance with the specification standards regarding asphalt damping sheets of certain auto parts factory.

The sample of embodiment 2 of the present invention was submitted to a third-party testing organization for testing other performances and the results were shown in table 3, wherein the performance test specifications and standards in table 3 were as follows:

Mildew performance was tested according to GMW3259 standards and no apparent mildew or musty should be occurred;

Atomization performance was tested according to GMW3235 standards, and the atomization amount should be greater than or equal to 80;

Odor test was performed according to GMW3205, and the odor level should be greater than or equal to 6 (level 10=odorless; level 8=perceivable odor; 6=tolerable odor; 4=disgusting odor; 2=very disgusting odor; 1=intolerable odor);

Flame retardancy was tested according to GMW323, and the combustion rate should not exceed 100 mm/min.

TABLE 3

The test results of other performances of sample of embodiment 2

| | Sample 1 | Sample 2 | Sample 3 |
|---|---|---|---|
| Mildew performance | no visible mildew no apparent musty | no visible mildew no apparent musty | no visible mildew no apparent musty |

TABLE 3-continued

The test results of other performances of sample of embodiment 2

|  | Sample 1 | Sample 2 | Sample 3 |
|---|---|---|---|
| Atomization amount | 88.67 | 89.33 | 88.00 |
| Odor level | 6.3 (wet method, 24 hours@70° C. ± 2° C. &50 ml deionized water) | 6.0 (dry method, 24 h@70° C. ± 2° C.) | — |
| Flame retardancy | non-combustible | non-combustible | non-combustible |

What is claimed is:

1. An asphalt damping sheet comprising the following components in indicated amounts based on the total mass of the asphalt damping sheet:
- 20-50 parts of a paint slag containing waste limestone powder collected from a dry separation process of overspray;
- 1-5 parts of soft pitch;
- 11-15 parts of hard pitch;
- 29-59 parts of a non-metallic mineral;
- 0.1-1.5 parts of polyethylene terephthalate short fibers;
- said non-metallic mineral is one or more selected from the group consisting of quartz sand, pottery clay and mica powder;
- said soft pitch is 30# pitch according to GB/T 494-2010 China national standard for asphalt;
- a melting point of the hard pitch is ranging from 100° C. to 130° C.;
- said polyethylene terephthalate short fibers have a length of 0.8-2 mm.

2. The asphalt damping sheet according to claim 1, characterized in that the particle size of the quartz sand is in the range of 100-300 mesh.

3. The asphalt damping sheet according to claim 1, further comprises 6-15 parts of magnetic powder.

4. The asphalt damping sheet according to claim 1, characterized in that said asphalt damping sheet further comprises an adhesive layer on the surface of the asphalt damping sheet.

5. The asphalt damping sheet according to claim 1, characterized in that a content of the paint slag is 7-13% relative to the total mass of the paint slag containing waste limestone powder.

* * * * *